(12) United States Patent
Kalidindi et al.

(10) Patent No.: US 11,935,098 B2
(45) Date of Patent: Mar. 19, 2024

(54) REQUEST PROCESSING FOR CONFIGURABLE INFORMATION TECHNOLOGY SOLUTIONS

(71) Applicant: EMC IP Holding Company LLC, Hopkinton, MA (US)

(72) Inventors: Varahala R. Kalidindi, Littleton, MA (US); Niall Brady, Rathfarnham (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 123 days.

(21) Appl. No.: 17/381,667

(22) Filed: Jul. 21, 2021

(65) Prior Publication Data

US 2023/0024588 A1 Jan. 26, 2023

(51) Int. Cl.
*G06Q 30/04* (2012.01)
*G06Q 30/0601* (2023.01)

(52) U.S. Cl.
CPC ......... *G06Q 30/04* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 8,239,246 B1* | 8/2012 | Bigham | G06Q 40/08 705/7.38 |
| 8,600,784 B1* | 12/2013 | Ivey | G06F 16/00 705/5 |
| 11,736,351 B2* | 8/2023 | Kompella et al. | G06Q 10/087 705/28 |
| 11,736,522 B2* | 8/2023 | Thomas et al. | G09B 5/02 |
| 2002/0001307 A1* | 1/2002 | Nguyen | H04L 41/0856 370/386 |
| 2002/0057018 A1* | 5/2002 | Branscomb | H04L 63/105 307/42 |
| 2004/0031030 A1* | 2/2004 | Kidder | H04L 41/22 717/172 |

(Continued)

OTHER PUBLICATIONS

Bill of materials, https://en.wikipedia.org/w/index.php?title=Bill_of_materials&oldid=1012289226, last edited Mar. 15, 2021, accessed on Jul. 21, 2021.

*Primary Examiner* — Fateh M Obaid
(74) *Attorney, Agent, or Firm* — Ryan, Mason & Lewis, LLP

(57) ABSTRACT

Methods, apparatus, and processor-readable storage media for request processing for configurable information technology solutions are provided herein. An example method includes obtaining a request that is to be processed based on a current configuration of a system, wherein the system comprises a plurality of items and each item comprises a set of components, each of the components having one of a plurality of types; obtaining component-level information for the plurality of items from multiple data sources; determining the current configuration of the system by applying one or more rules to the component-level information that identify at least one particular one of the types of at least one of the components in each of one or more of the sets and a quantity of the components of the at least one particular type that are in the corresponding set; and processing the request based on the determined current configuration.

20 Claims, 9 Drawing Sheets

300

| ASSET | ASSET COMPONENTS | | QUANTITY |
|---|---|---|---|
| ACME INC'S STORAGE: 123XYZ | 1TB HARD DRIVE | 1TB HDD ASSEMBLY: HDD23455 — CARRIAGE | 1 |
| | | DRIVE | 1 |
| | | SPINDLE | 1 |
| | | PORT INTERFACE | 1 |
| | | SCREWS | 4 |
| | | 1TB HDD ASSEMBLY: HDD98787 — CARRIAGE | 1 |
| | | DRIVE | 1 |
| | | SPINDLE | 1 |
| | | PORT INTERFACE | 1 |
| | | SCREWS | 4 |
| | STORAGE OS — SECURE PLUS | OS CORE: LIC 78978 | 1 |
| | | OS SECURITY MODULE: LIC 9877 | 1 |

202   204   206   208

(56) References Cited

U.S. PATENT DOCUMENTS

| | | | |
|---|---|---|---|
| 2004/0113945 A1* | 6/2004 | Park | G06F 30/13 715/765 |
| 2006/0041840 A1* | 2/2006 | Blair | G06F 17/00 715/234 |
| 2010/0161364 A1* | 6/2010 | Lokowandt | G06Q 10/087 705/28 |
| 2010/0161365 A1* | 6/2010 | Lokowandt | G06Q 30/0601 705/28 |
| 2012/0197950 A1* | 8/2012 | Dayal | G06Q 30/02 707/822 |
| 2018/0136793 A1* | 5/2018 | Kohlhoff | G09B 5/02 |
| 2019/0245894 A1* | 8/2019 | Epple et al. | G06Q 30/0601 705/28 |
| 2022/0068242 A1* | 3/2022 | Maloney | G09G 5/363 |

* cited by examiner

| ASSET | ASSET COMPONENTS | | QUANTITY |
|---|---|---|---|
| ACME INC'S STORAGE: 123XYZ | 1TB HARD DRIVE | 1TB HDD ASSEMBLY: HDD23455 | |
| | | CARRIAGE | 1 |
| | | DRIVE | 1 |
| | | SPINDLE | 1 |
| | | PORT INTERFACE | 1 |
| | | SCREWS | 4 |
| | STORAGE OS – SECURE PLUS | OS CORE: LIC 78978 | 1 |
| | | OS SECURITY MODULE: LIC 9877 | 1 |

| ASSET | | ASSET COMPONENTS | | QUANTITY |
|---|---|---|---|---|
| ACME INC'S STORAGE: 123XYZ | 1TB HARD DRIVE | 1TB HDD ASSEMBLY: HDD23455 | CARRIAGE | 1 |
| | | | DRIVE | 1 |
| | | | SPINDLE | 1 |
| | | | PORT INTERFACE | 1 |
| | | | SCREWS | 4 |
| | | 1TB HDD ASSEMBLY: HDD98787 | CARRIAGE | 1 |
| | | | DRIVE | 1 |
| | | | SPINDLE | 1 |
| | | | PORT INTERFACE | 1 |
| | | | SCREWS | 4 |
| | STORAGE OS – SECURE PLUS | OS CORE: LIC 78978 | | 1 |
| | | OS SECURITY MODULE: LIC 9877 | | 1 |

| ASSET | ASSET COMPONENTS | | | |
|---|---|---|---|---|
| | | | | QUANTITY |
| ACME INC'S STORAGE: 123XYZ | 1TB HARD DRIVE | 1TB HDD ASSEMBLY: HDD23455 | CARRIAGE | 1 |
| | | | DRIVE | 1 |
| | | | SPINDLE | 1 |
| | | | PORT INTERFACE | 1 |
| | | | SCREWS | 4 |
| | | 1TB HDD ASSEMBLY: HDD98787 | CARRIAGE | 1 |
| | | | DRIVE | 1 |
| | | | SPINDLE | 1 |
| | | | PORT INTERFACE | 1 |
| | | | SCREWS | 4 |
| | STORAGE OS – SECURE PLUS | OS CORE: LIC 78978 | | 1 |
| | | OS SECURITY MODULE: LIC 9877 | | 1 |
| 202 | 204 | 206 | | 208 |

| ASSET | ASSET COMPONENTS | | QUANTITY |
|---|---|---|---|
| ACME INC'S STORAGE: 123XYZ | 1TB HARD DRIVE | CARRIAGE | 2 |
| | | DRIVE: HDD23455, HDD98787 | 2 |
| | | SPINDLE | 2 |
| | | PORT INTERFACE | 2 |
| | | SCREWS | 8 |
| | STORAGE OS – SECURE PLUS | OS CORE: LIC 78978 | 1 |
| | | OS SECURITY MODULE: LIC 9877 | 1 |

| ASSET | ASSET COMPONENTS | | QUANTITY |
|---|---|---|---|
| ACME INC'S STORAGE: 123XYZ | 1TB HARD DRIVE – 4PACK | | 4 |
| | | CARRIAGE | |
| | 1TB HDD ASSEMBLY | DRIVE: HDD23455; HDD98787; HDD23456; HDD23457; HDD23458 | 5 |
| | | SPINDLE | 5 |
| | | PORT INTERFACE | 4 |
| | | SCREWS | 25 |
| | STORAGE OS – SECURE PLUS | OS CORE: LIC 78978 | 1 |
| | | OS SECURITY MODULE: LIC 9877 | 1 |

FIG. 6

REQUEST PROCESSING FOR CONFIGURABLE INFORMATION TECHNOLOGY SOLUTIONS

FIELD

The field relates generally to information processing systems, and more particularly to automatically processing requests, in view of changing infrastructure, in such information processing systems.

BACKGROUND

Generally, information technology (IT) solutions are designed to be configurable in order to adapt to the changing needs of a customer. As an example, a vendor may receive a request from a customer for a particular configuration of a storage technology, and a number of modifications may be made to the storage technology during its lifecycle. Requests related to the storage technology can often depend upon the current configuration, which is difficult to determine in view of such modifications.

SUMMARY

Illustrative embodiments of the disclosure provide techniques for request processing for configurable IT solutions. An exemplary computer-implemented method includes obtaining a request that is to be processed based on a current configuration of a system, wherein the system comprises a plurality of items and each item comprises a set of components, each of the components having one of a plurality of types and comprising one or more of: at least one software component and at least one hardware component; obtaining component-level information for the plurality of items from multiple data sources; determining the current configuration of the system by applying one or more rules to the component-level information, wherein the one or more rules identify at least one particular one of the plurality of types of at least one of the components in each of one or more of the sets and a quantity of the components of the at least one particular type that are in the corresponding set; and processing the request based at least in part on the determined current configuration.

Illustrative embodiments can provide significant advantages relative to conventional request processing techniques. For example, challenges associated with the processing of requests based on a current configuration of a system are overcome in one or more embodiments using techniques to determine the current configuration of the infrastructure based on multiple sources of information, where the disclosed techniques are more efficient and/or more accurate than conventional techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example of a combined hierarchical data structure in an illustrative embodiment.

FIG. 3 shows a first example of a modification to the combined hierarchical data structure of FIG. 2 in an illustrative embodiment.

FIG. 4 shows a second example of a modification to the combined hierarchical data structure of FIG. 2 in an illustrative embodiment.

FIG. 5 shows a third example of a modification to the combined hierarchical data structure of FIG. 2 in an illustrative embodiment.

FIG. 6 shows a fourth example of a modification to the combined hierarchical data structure of FIG. 2 in an illustrative embodiment.

DETAILED DESCRIPTION

Figure 1:
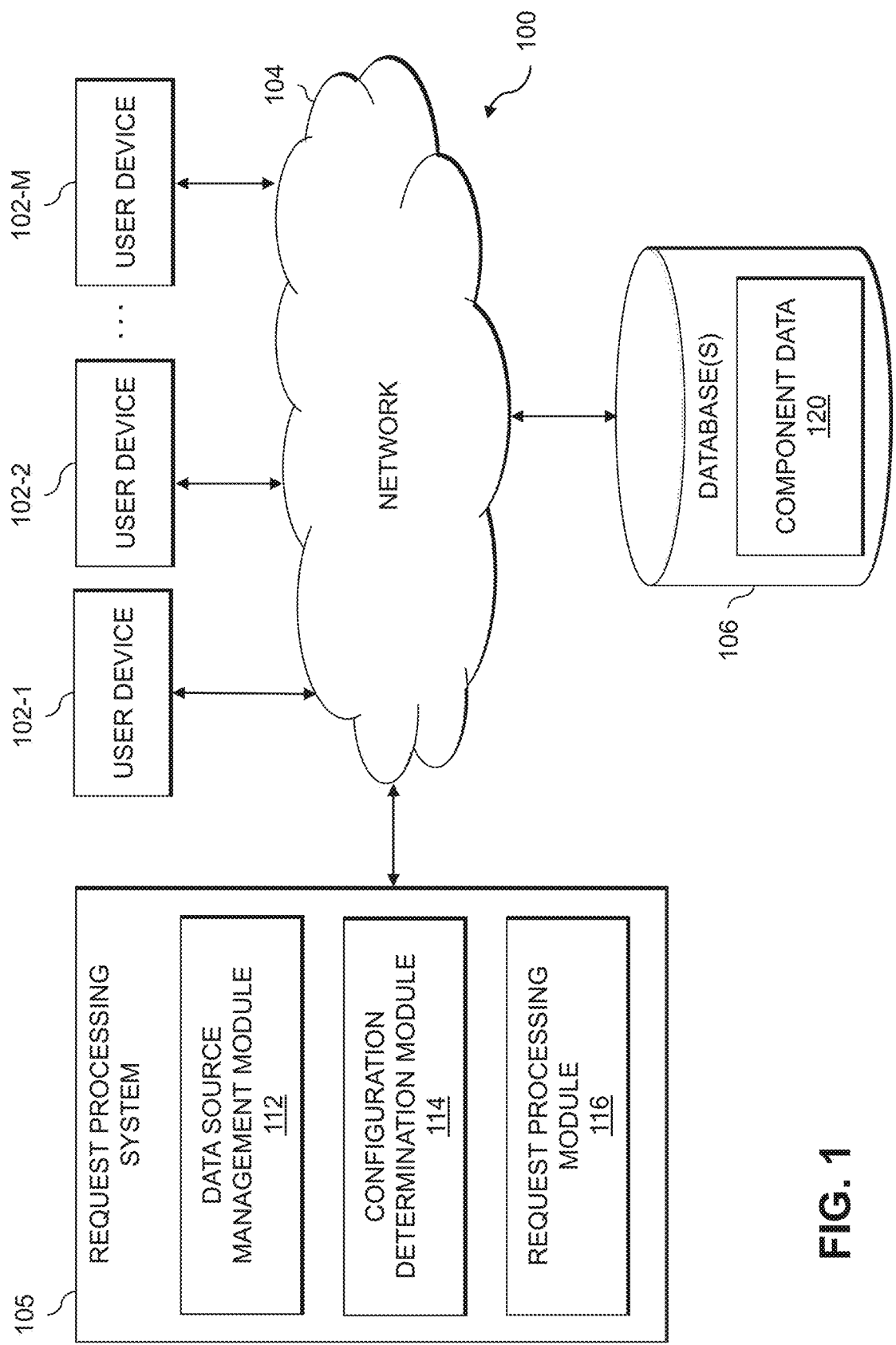
FIG. 1 shows an information processing system configured for processing requests in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

The exemplary embodiments are generally described herein with reference to a storage solution; however, it is to be understood that such embodiments may be more generally applied to other IT solutions that undergo changes throughout their respective lifecycles. In a typical situation, a vendor may receive a request from a customer for a particular configuration of a system or solution, which can be modified in many ways once it has been provided to the customer. For example, modifications can occur during the manufacturing process even before the equipment arrives at the customer site. These modifications can result in the "as-built" configuration differing from the configuration that was initially requested (referred to herein as the "as-requested configuration"). Once at the customer site, the configuration can be changed by field service activities to resolve problems or by the customer (e.g., when the customer needs to move capacity between storage arrays to support the fluctuating activities of their business). These activities can result in the as-maintained representation of the configuration differing from both the as-requested and as-built representations. Finally, most storage technology is upgraded or added to over the course of its lifecycle such as when the customer purchases more capacity, higher-volume drives, and additional software, for example. Each additional modification results in another set of as-requested, as-built and as-maintained representations, each of which relates to the sets of data from the first sale.

Some technical solutions enable a vendor to keep track of the as-maintained representation of customer equipment so that the vendor can use it for processing requests related to, for example, technical support, field services and warranty renewals. As an example, when a customer buys a storage solution, the price of the warranty and support contract is often determined by the size and complexity of the solution. When the warranty and support contract is expiring and the customer wants to renew it, the price of the renewal should depend on the size and complexity of the solution. Such support renewals may occur multiple years after the initial sale, during which time a significant number of upgrades, add-ons and field activities may have occurred. For example, the solution may be running at a significantly higher, or lower, capacity than when it was initially sold. This makes it difficult for the vendor to establish the current size and complexity of the solution when processing such requests.

The as-requested representation of the solution is intended to accurately show what has been sold to the customer since the initial sale. However, the as-requested representation does not provide an accurate representation of how the customer is currently using the solution. Likewise, the as-built representation shows what was shipped to the customer site each time they ordered new equipment but may fail to show how the equipment is currently working. The as-maintained representation of the solution should provide the best set of data for processing requests dependent upon the current configuration.

Requests for certain services related to storage solutions are often processed based on the size and complexity of the storage solution. The size and complexity of the storage solution are generally determined by sellable product data, whereas the as-maintained representation is typically maintained using lower-level product data. For example, as-maintained data are used to track individual hard drives, often with unique serial numbers, because that is what is physically added to, or removed from, a storage array, whereas the customer may purchase a "bundle" of multiple drives. In terms of product data, the individual drives are represented by assembly items that describe how the drives are physically assembled in a factory, while the bundle describes how the vendor prices, quotes, and invoices the customer for those drives. Requests related to services are generally processed when the customer is buying new equipment based on the price and quantity of the sellable product, as opposed to data related to the manufacturing product, which is generally not interpretable by tools used to process such requests (e.g., automated sales and quoting tools). This often leads to inconsistencies and errors in the data representations, which may require manual intervention.

Exemplary embodiments described herein provide improved techniques for processing requests that are dependent on a current configuration of an IT solution while avoiding issues and constraints encountered in traditional IT stacks when responding to such requests. In this context, the term "request" is intended to be broadly construed so as to encompass, for example, proposals and requests related to acquiring or modifying services pertaining to configurable IT solutions.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is request processing system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, request processing system 105 can have at least one associated database 106 configured to store component data 120 pertaining to, for example, manufacturing data for the components of an IT solution. As an example, the components of the IT solution may include software components (such as operating system (OS) software and security software as non-limiting examples) and/or hardware components (such as hard disk drives and processors as non-limiting examples).

An example database 106, such as depicted in the present embodiment, can be implemented using one or more storage systems associated with request processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with request processing system 105 are one or more input-output devices, which illustratively comprise keyboards, displays or other types of input-output devices in any combination. Such input-output devices can be used, for example, to support one or more user interfaces to request processing system 105, as well as to support communication between request processing system 105 and other related systems and devices not explicitly shown.

Additionally, request processing system 105 in the FIG. 1 embodiment is assumed to be implemented using at least one processing device. Each such processing device generally comprises at least one processor and an associated memory, and implements one or more functional modules for controlling certain features of request processing system 105.

More particularly, request processing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows request processing system 105 to communicate over the network 104 with the user devices 102, and illustratively comprises one or more conventional transceivers.

The request processing system 105 further comprises a data source management module 112, a configuration determination module 114, and a request processing module 116.

It is to be appreciated that this particular arrangement of modules 112, 114 and 116 illustrated in the request processing system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for implementing request data structures involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of request processing system 105 and database(s) 106 can be on and/or part of the same processing platform.

An exemplary process utilizing modules 112, 114 and 116 of an example request processing system 105 in computer network 100 will be described in more detail with reference to the flow diagram of FIG. 7.

One or more embodiments include identifying particular data sources relevant to processing a request based on a current configuration of a system. For example, the data sources may include one or more of: sales order data that indicate one or more sales orders configured by a customer that includes a set of product data items; one or more bills of material, which translate the sales order data to lower-level manufacturing data in order to meet the configuration identified in the sales order; parts substitution data (e.g., a manufacturing list of eligible parts that can be used to replace lower-level product data based on availability); and serialized component data that is automatically communicated by an asset back to the vendor (e.g., phone home data).

Generally, the term "asset" is used herein to refer to uniquely serialized items that are sold to a customer, such as hardware equipment or software. In some examples, an asset can be covered by warranty or support contracts. The term "asset component" is used herein to refer to the constituent parts of a given asset (e.g., hard drives or memory cards for a storage array or modules that make up a software bundle or package). Asset components may also be uniquely serialized and are often replaceable, upgradable, and/or portable between different assets. In some embodiments, asset components can be instances of the sales product data items from the customer configuration and sales order, or instances of manufacturing product data items (such as from the Bill of Materials or as-maintained data sources, for example). In at least some embodiments, instances from different data sources can be combined into a single hierarchical data structure as described in conjunction with FIGS. 2-6, for example.

FIG. 2 shows an example of a combined hierarchical data structure 200 in an illustrative embodiment. It is assumed that the example depicted in FIG. 2 relates to an initial configuration of the asset, and the examples shown in FIGS. 3-6 relate to modified configurations of the asset.

Column (or field) 202 of the combined hierarchical data structure 200 includes a description of the asset and a unique identifier of the asset ("123XYZ"). In this example, a customer has configured the asset with a 1 TB hard drive option and an OS having a "Secure Plus" upgrade as indicated by column 204. The asset components identified in column 204 are considered "sellable items" from the customer configuration and represent the top-level components within the asset. Each top-level asset component includes lower-level components derived from a Bill of Materials that is fulfilled when the customer buys each of the top-level, sellable items. More specifically, columns 206 identify a 1 TB HDD Assembly and a set of physical parts needed to make a working hard drive. It is noted that the 1 TB HDD Assembly is serialized too, so that both the vendor and customer can track the hard drive throughout its lifecycle. Columns 206 also identify an OS software bundle that includes two modules, namely, OS Core and OS Security Module, each having a respective license number. The respective quantities of the sub-components are identified in column 208.

When processing a request related to the asset depicted in FIG. 2, different components and/or sub-components may be considered depending on the type of request. For example, a request relating to a renewal of a service may consider only the top-level components, which correspond to the selections that the customer made when configuring the product. Since these selections are based on sales product data items, each has a price and a commercial context (such as, for example, availability, price, discount based on segment, and customer).

FIGS. 3-5 show different ways in which data resulting from a modification of the asset can be incorporated into the combined hierarchical data structure of FIG. 2. It is assumed that the modification corresponds to the addition of a hard drive. The new hard drive could have been moved from another storage array or bought as a stand-alone part and plugged in. The additional hard drive adds complexity, and thus should be considered when processing service requests. The additional data, in some embodiments, are added in response to receiving as-maintained data from the asset (e.g., phone home data). More generally, modifications may occur due to service activities, upgrades, additions, and/or alterations by the customer, for example.

In each of the combined hierarchical data structures 300, 400, and 500 the additional data pertaining to the new hard drive is incorporated into the fields that have dark shading. In the FIG. 3 example, the additional data can be identified in a straightforward manner as each hard drive is listed as a separate component. However, such data are often incorporated using different formats. For example, in FIG. 4, the additional data are flattened in the combined hierarchical data structure 400, whereas in other examples the additional data are grouped and/or serialized at a lower level as shown in the combined hierarchical data structure 500 of FIG. 5.

FIG. 6 shows yet another example of a combined hierarchical data structure that can lead to inconsistencies in how data are incorporated and represented. In contrast to FIGS. 2-5, it is assumed that a customer configured the asset identified in column 202 of the combined hierarchical data structure 600 with a "4 pack" of 1 TB hard drives as shown in column 204, which typically are built as four complete drive assemblies each with a serialized drive part. A fifth serialized hard drive having a serial number of HDD98787 was added by the customer (e.g., at some later point in time) as indicated by the bold font in the combined hierarchical data structure 600. If the request is based on the sellable product (which in this example corresponds to a pack of four hard drives), then it is important to identify the correct quantity. To accomplish this, one or more embodiments check a product data source system to extract the number of the serialized drive parts that are sold for each sellable drive item, which in this case is four. Accordingly, the quantity of the sellable product is equal to 1.2 of the "1 TB hard drive—4pack" item.

It is also noted that some of the quantities in column 208 of the combined hierarchical data structure 600 are evenly divisible by five, but the quantity of the Carriage and Port Interface parts are not. This could be due to an error resulting from when the fifth drive was added, or it could be due to an error or omission, which is relatively common with as-maintained data. Another possibility is that the quantities are accurate, such as if the fifth drive were to share an existing Carriage or Port Interface. As such, embodiments described herein enable the correct lower-level part to be selected when calculating the sellable items as-maintained quantity.

In addition to the problems discussed above in conjunction with FIGS. 2-6, a bill of materials may be incomplete, or there may be part substitutions so that two components of the same type of assembly have different sub-components, thereby making it difficult to identify the sales product data items and determine the correct quantity of such items.

Example embodiments utilize a process for identifying the correct quantity and identity of sales product data items that are to be used when processing a request. The process can be utilized for bases of storage products from multiple manufacturers, and many order-to-fulfilment processes and sources of as-maintained data. It is assumed an asset, A, refers to a set of product items, S, (e.g., sellable products), and each product item in S includes a set of parts, P. The set of parts may be assemblies, digital parts, and/or physical parts, which represent how a system is built, for example. Accordingly, an asset component is represented as a set of ordered pairs of S and P, with each instance expressed as (s, p). The output, R, of the process includes a set of unique (s, p) pairs and the quantity of p for each s for a given asset A.

In some example embodiments, the process to select the set of unique (s, p) pairs includes a first step of removing pairs that are not relevant to the request, and a second step of selecting the most relevant element, p, from the set P for each element in the set S.

In some embodiments, the first step includes creating a subset, $S_R$, of S, by applying a predicate to the set S. The predicate may be defined by criteria that must be met by each element of S in order to qualify for inclusion in the subset $S_R$. As an example, for storage solutions, the criteria may include the following:
  a. The element is supportable or installed base trackable;
  b. The element includes an effective list price; and
  c. The element is factored into the pricing of warranty, maintenance or other services.

Accordingly, the first step of the process may be expressed as follows: $S_R=\{s\in S|\Phi(s)\}$, where $\Phi$ represents the predicate applied to S. As such, $S_R$ consists of a subset, $P_R$, of P.

The second step of the process selects the appropriate element of $P_R$ for each element of $S_R$ in order to create the set of unique and filtered values of the pair $(s_r, p_r)$. The second step may include applying a hierarchy of conditions to determine the most suitable part, $p_r$, to pair with its parent item, $s_r$, in order to process the request. In one embodiment, the following hierarchy of conditions may be applied until a single record remains:
  a. If there are parts that represent full assemblies of field-replaceable units then filter out the other parts.
  b. If there are remaining parts that are serialized, then filter out the other remaining parts.
  c. If there are any remaining parts, then select a unique part (e.g., by applying a max function) from the highest level of the BOM that can be determined.

Now that the ordered pairs $(s_r, p_r)$ are determined, what remains is to determine the correct quantity for each $s_r$ and to obtain any other information relevant to the type of request (such as a list price or a relevant currency for the required sales context, for example). The following formula may be used to determine the correct quantity:

$$\sum_{1}^{N}\left(\text{serialized parts count} * \left(\frac{\text{Sellable Model}}{\text{BOM Part or substituted part quantity}}\right)\right).$$

As an example, the request may relate to a support renewal, and processing the request may include configuring the renewal with the appropriate price based on the quantity determined above multiplied by the monthly maintenance rate and duration of time of the renewal.

The process above can be applied consistently to storage products sold, manufactured and maintained through multiple system stacks, different factories, varying remote monitoring data sources and different maintenance processes, for example.

Figure 7:
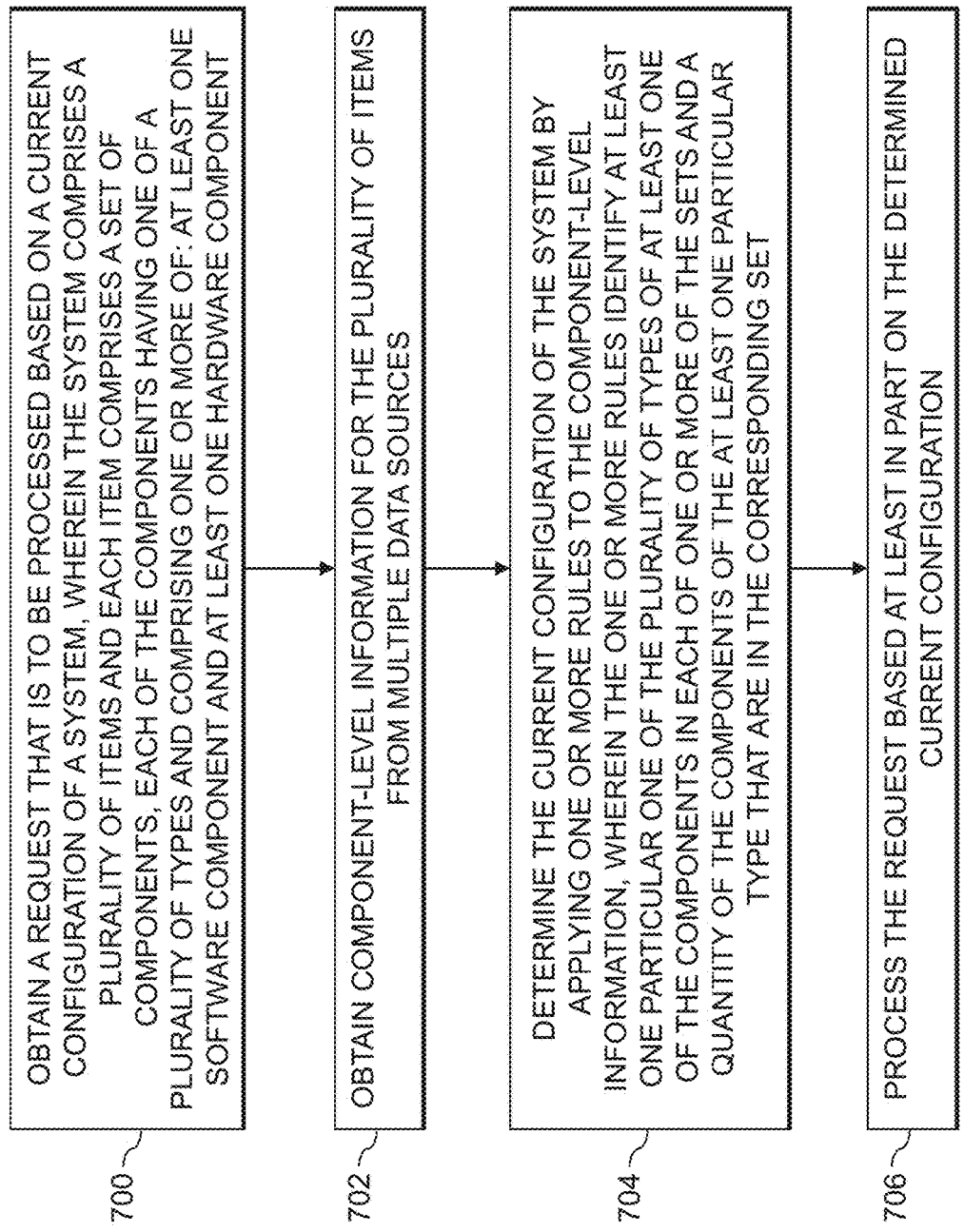
FIG. 7 shows a flow diagram for request processing in an illustrative embodiment.

FIG. 7 is a flow diagram of a process for request processing in an illustrative embodiment. It is to be understood that this particular process is only an example, and additional or alternative processes can be carried out in other embodiments. In this embodiment, the process includes steps 700 through 706. These steps are assumed to be performed by the request processing system 105 utilizing its modules 112, 114 and 116.

Step 700 includes obtaining a request that is to be processed based on a current configuration of a system, wherein the system comprises a plurality of items and each item comprises a set of components, each of the components having one of a plurality of types and comprising one or more of: at least one software component and at least one hardware component. Step 702 includes obtaining component-level information for the plurality of items from multiple data sources. Step 704 includes determining the current configuration of the system by applying one or more rules to the component-level information, wherein the one or more rules identify at least one particular one of the plurality of types of at least one of the components in each of one or more of the sets and a quantity of the components of the at least one particular type that are in the corresponding set. Step 706 includes processing the request based at least in part on the determined current configuration.

The multiple data sources may include two or more of: one or more sales orders associated with one or more previous configurations of the system; one or more bills of materials associated with the system; and automated reporting data associated with one or more of the plurality of items. The request may correspond to one or more of adding, altering, and extending at least one service associated with the system. The determining the current configuration of the system may include: removing from the one or more of the sets that are not relevant to the at least one service. A given one of the types of components may be removed based on at least one of: whether the component-level information comprises pricing information for the given type of component; whether the given type of component is used to determine a pricing of the at least one service; and whether the given type of the components is at least one of supportable or trackable.

The one or more rules may include at least one of: in response to determining that one or more components in the respective set corresponds to a full product assembly, removing the other components from the respective set; in response to determining that the component-level information indicates a serial number for at least one of the components in the respective set, removing the other components from the respective set; and determining a hierarchy of the one or more components in the respective set based on a bill of materials and selecting a unique component in the respective set based on the determined hierarchy. The process in FIG. 7 may further include a step of: combining the component-level information from the multiple data sources into a hierarchical data structure, wherein the component-level information is represented in the hierarchical data structure using multiple formats. The multiple formats may result from at least one of: at least a portion of the component-level information being flattened; the component-level information corresponding to a same type of component being grouped at different levels in the hierarchical data structure; and the component-level information corresponding to a same type of component being serialized at different levels in the hierarchical data structure. The one or more rules may be configured to resolve inconsistencies in the hierarchical data structure resulting from the multiple formats.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency of identifying the correct components and quantities of such components in order to process requests that are dependent upon a current configuration of an IT solution. These and other embodiments can effectively overcome inconsistencies and errors in data when processing such requests, for example.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
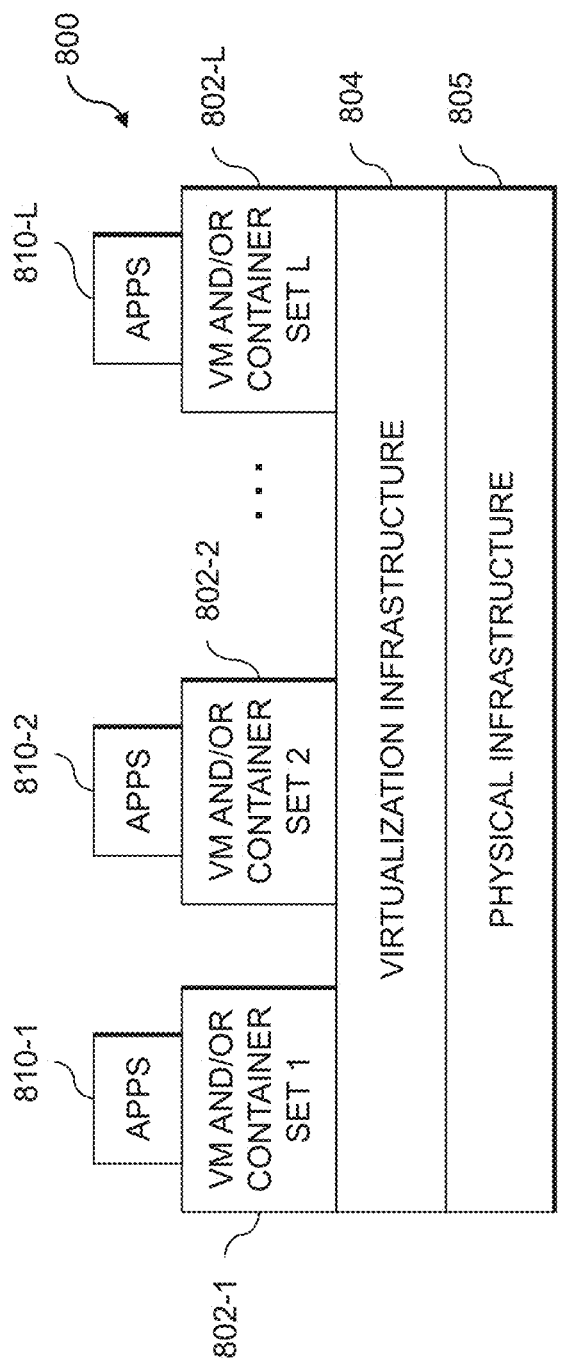
FIGS. 8 and 9 show examples of processing platforms that may be utilized to implement at least a portion of an information processing system in illustrative embodiments.
Figure 9:
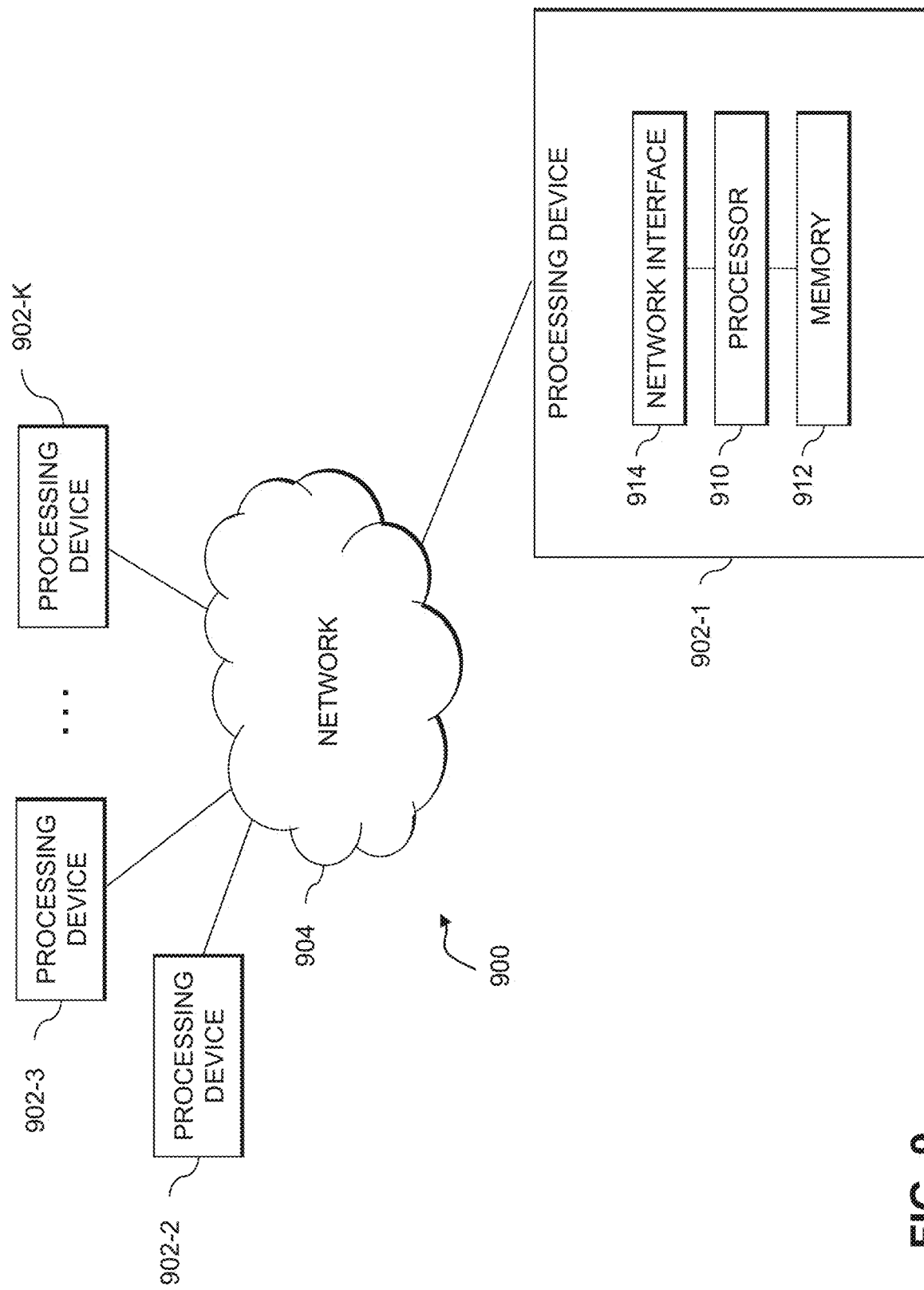

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or OS level virtualization infrastructure. The OS level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides OS level virtualization functionality, such as support for Docker containers running on bare metal hosts, or Docker containers running on VMs. The containers are illustratively implemented using respective kernel control groups of the OS.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an application-specific integrated circuit (ASIC), a field-programmable gate array (FPGA) or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining, by at least one first system of a service provider, a request that is to be processed based on a current configuration of a second system, wherein the second system comprises a plurality of items and each item comprises a set of components, each of the components having one of a plurality of types and comprising one or more of: at least one software component and at least one hardware component, wherein the current configuration comprises one or more differences relative to an initial configuration of the second system provided by the service provider;
    obtaining, by the at least one first system, component-level information for the plurality of items from multiple data sources, wherein a first one of the multiple data sources and a second one of the multiple data sources represent at least one of the plurality of items in different formats, thereby resulting in one or more inconsistencies in the component-level information for the at least one of the plurality of items;
    combining the component-level information obtained from the multiple data sources into a hierarchical data structure;
    determining, by the at least one first system, the current configuration of the second system by applying one or more rules to the hierarchical data structure, wherein the one or more rules resolve the one or more inconsistencies in the component-level information for the at least one of the plurality of items and identify at least one particular one of the plurality of types of at least one of the components in each of one or more of the sets and a quantity of the components of the at least one particular type that are in the corresponding set; and
    processing, by the at least one first system, the request based at least in part on the determined current configuration;
    wherein the method is performed by at least one processing device comprising a processor coupled to a memory.

2. The computer-implemented method of claim 1, wherein the multiple data sources comprise two or more of:
    one or more sales orders associated with one or more previous configurations of the second system;
    one or more bills of materials associated with the second system; and
    automated reporting data associated with one or more of the plurality of items.

3. The computer-implemented method of claim 1, wherein the request corresponds to one or more of adding, altering, and extending at least one service associated with the second system.

4. The computer-implemented method of claim 3, wherein the determining the current configuration of the second system comprises:
    removing types of components from the one or more of the sets that are not relevant to the at least one service.

5. The computer-implemented method of claim 3, wherein a given one of the types of components is removed based on at least one of:
    whether the component-level information comprises pricing information for the given type of component;
    whether the given type of component is used to determine a pricing of the at least one service; and
    whether the given type of the components is at least one of supportable or trackable.

6. The computer-implemented method of claim 1, wherein the one or more rules comprise at least one of:
    in response to determining that one or more components in the respective set corresponds to a full product assembly, removing the other components from the respective set;
    in response to determining that the component-level information indicates a serial number for at least one of the components in the respective set, removing the other components from the respective set; and
    determining a hierarchy of the one or more components in the respective set based on a bill of materials and selecting a unique component in the respective set based on the determined hierarchy.

7. The computer-implemented method of claim 1, wherein the one or more inconsistencies result from at least one of:
    at least a portion of the component-level information being flattened;
    the component-level information corresponding to a same type of component being grouped at different levels in the hierarchical data structure; and
    the component-level information corresponding to a same type of component being serialized at different levels in the hierarchical data structure.

8. A non-transitory processor-readable storage medium having stored therein program code of one or more software programs, wherein the program code when executed by at least one processing device causes the at least one processing device:
    to obtain, by at least one first system of a service provider, a request that is to be processed based on a current configuration of a second system, wherein the second system comprises a plurality of items and each item comprises a set of components, each of the components having one of a plurality of types and comprising one or more of: at least one software component and at least one hardware component, wherein the current configuration comprises one or more differences relative to an initial configuration of the second system provided by the service provider;
    to obtain, by the at least one first system, component-level information for the plurality of items from multiple data sources, wherein a first one of the multiple data sources and a second one of the multiple data sources represent at least one of the plurality of items in different formats, thereby resulting in one or more inconsistencies in the component-level information for the at least one of the plurality of items;

to combine the component-level information obtained from the multiple data sources into a hierarchical data structure;

to determine, by the at least one first system, the current configuration of the second system by applying one or more rules to the hierarchical data structure, wherein the one or more rules resolve the one or more inconsistencies in the component-level information for the at least one of the plurality of items and identify at least one particular one of the plurality of types of at least one of the components in each of one or more of the sets and a quantity of the components of the at least one particular type that are in the corresponding set; and to process, by the at least one first system, the request based at least in part on the determined current configuration.

9. The non-transitory processor-readable storage medium of claim 8, wherein the multiple data sources comprise two or more of:
one or more sales orders associated with one or more previous configurations of the second system;
one or more bills of materials associated with the system; and
automated reporting data associated with one or more of the plurality of items.

10. The non-transitory processor-readable storage medium of claim 8, wherein the request corresponds to one or more of adding, altering, and extending at least one service associated with the second system.

11. The non-transitory processor-readable storage medium of claim 10, wherein the determining the current configuration of the system comprises:
removing types of components from the one or more of the sets that are not relevant to the at least one service.

12. The non-transitory processor-readable storage medium of claim 8, wherein the one or more rules comprise at least one of:
in response to determining that one or more components in the respective set corresponds to a full product assembly, removing the other components from the respective set;
in response to determining that the component-level information indicates a serial number for at least one of the components in the respective set, removing the other components from the respective set; and
determining a hierarchy of the one or more components in the respective set based on a bill of materials and selecting a unique component in the respective set based on the determined hierarchy.

13. An apparatus comprising:
at least one processing device comprising a processor coupled to a memory;
the at least one processing device being configured:
to obtain, by at least one first system of a service provider, a request that is to be processed based on a current configuration of a second system, wherein the second system comprises a plurality of items and each item comprises a set of components, each of the components having one of a plurality of types and comprising one or more of: at least one software component and at least one hardware component, wherein the current configuration comprises one or more differences relative to an initial configuration of the second system provided by the service provider;

to obtain, by the at least one first system, component-level information for the plurality of items from multiple data sources, wherein a first one of the multiple data sources and a second one of the multiple data sources represent at least one of the plurality of items in different formats, thereby resulting in one or more inconsistencies in the component-level information for the at least one of the plurality of items;

to combine the component-level information obtained from the multiple data sources into a hierarchical data structure;

to determine, by the at least one first system, the current configuration of the second system by applying one or more rules to the hierarchical data structure, wherein the one or more rules resolve the one or more inconsistencies in the component-level information for the at least one of the plurality of items and identify at least one particular one of the plurality of types of at least one of the components in each of one or more of the sets and a quantity of the components of the at least one particular type that are in the corresponding set; and to process, by the at least one first system, the request based at least in part on the determined current configuration.

14. The apparatus of claim 13, wherein the multiple data sources comprise two or more of:
one or more sales orders associated with one or more previous configurations of the second system;
one or more bills of materials associated with the second system; and
automated reporting data associated with one or more of the plurality of items.

15. The apparatus of claim 13, wherein the request corresponds to one or more of adding, altering, and extending at least one service associated with the second system.

16. The apparatus of claim 13, wherein the one or more rules comprise at least one of:
in response to determining that one or more components in the respective set corresponds to a full product assembly, removing the other components from the respective set;
in response to determining that the component-level information indicates a serial number for at least one of the components in the respective set, removing the other components from the respective set; and
determining a hierarchy of the one or more components in the respective set based on a bill of materials and selecting a unique component in the respective set based on the determined hierarchy.

17. The non-transitory processor-readable storage medium of claim 8, wherein the one or more inconsistencies result from at least one of:
at least a portion of the component-level information being flattened;
the component-level information corresponding to a same type of component being grouped at different levels in the hierarchical data structure; and
the component-level information corresponding to a same type of component being serialized at different levels in the hierarchical data structure.

18. The non-transitory processor-readable storage medium of claim 10, wherein a given one of the types of components is removed based on at least one of:

whether the component-level information comprises pricing information for the given type of component;

whether the given type of component is used to determine a pricing of the at least one service; and whether the given type of the components is at least one of supportable or trackable.

19. The apparatus of claim 13, wherein the one or more inconsistencies result from at least one of:

at least a portion of the component-level information being flattened;

the component-level information corresponding to a same type of component being grouped at different levels in the hierarchical data structure; and the component-level information corresponding to a same type of component being serialized at different levels in the hierarchical data structure.

20. The apparatus of claim 15, wherein the determining the current configuration of the system comprises:

removing types of components from the one or more of the sets that are not relevant to the at least one service.

* * * * *